United States Patent
Zimmerman

(10) Patent No.: US 9,076,101 B1
(45) Date of Patent: *Jul. 7, 2015

(54) PRINTER FORMATTER IN A CABLE

(71) Applicant: Marvell International Technology Ltd., Hamilton (BM)

(72) Inventor: Gary Daren Zimmerman, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,940

(22) Filed: Dec. 19, 2012

Related U.S. Application Data

(60) Continuation of application No. 12/715,022, filed on Mar. 1, 2010, now Pat. No. 8,339,647, which is a continuation of application No. 11/851,120, filed on Sep. 6, 2007, now Pat. No. 7,715,039, which is a division of application No. 09/675,194, filed on Sep. 29, 2000, now Pat. No. 7,268,900.

(51) Int. Cl.
 *G06K 15/00* (2006.01)
 *G06F 3/12* (2006.01)

(52) U.S. Cl.
 CPC ..................................... *G06K 15/40* (2013.01)

(58) Field of Classification Search
 CPC ........... G06F 8/61; G06F 8/65; G06F 3/1225; G06F 3/1228; G06F 3/1211; G06F 3/1247
 See application file for complete search history.

(56) References Cited

U.S. PATENT DOCUMENTS

| | | | |
|---|---|---|---|
| 5,729,204 A | 3/1998 | Fackler | |
| 5,930,553 A | 7/1999 | Hirst et al. | |
| 5,978,943 A | 11/1999 | Narukawa | |
| 5,989,051 A | 11/1999 | Zelno et al. | |
| 6,113,208 A | 9/2000 | Benjamin et al. | |
| 6,131,088 A | 10/2000 | Hill | |
| 6,151,643 A | 11/2000 | Cheng et al. | |
| 6,247,081 B1 | 6/2001 | Murata | |
| 6,256,668 B1 | 7/2001 | Slivka et al. | |
| 6,260,160 B1 * | 7/2001 | Beyda et al. | 714/27 |
| 6,333,790 B1 | 12/2001 | Kageyama | |
| 6,438,643 B1 | 8/2002 | Ohara et al. | |
| 6,538,762 B1 * | 3/2003 | Terashima et al. | 358/1.15 |
| 6,587,140 B2 | 7/2003 | No | |
| 6,606,669 B1 * | 8/2003 | Nakagiri | 719/327 |
| 6,622,246 B1 | 9/2003 | Biondi | |
| 6,665,089 B1 | 12/2003 | Austin et al. | |
| 6,753,903 B1 | 6/2004 | Lin | |
| 6,982,800 B1 | 1/2006 | Cavill et al. | |
| 7,268,900 B1 * | 9/2007 | Zimmerman | 358/1.15 |
| 7,715,039 B2 * | 5/2010 | Zimmerman | 358/1.15 |
| 8,339,647 B2 * | 12/2012 | Zimmerman | 358/1.15 |
| 2002/0026634 A1 * | 2/2002 | Shaw | 717/173 |
| 2003/0016376 A1 | 1/2003 | Narushima | |
| 2003/0193685 A1 * | 10/2003 | Kageyama | 358/1.14 |
| 2007/0279686 A1 | 12/2007 | Zimmerman | |
| 2007/0297007 A1 | 12/2007 | Zimmerman | |

* cited by examiner

*Primary Examiner* — Thierry L Pham

(57) ABSTRACT

A printer cable that is configured for coupling to a printer having an enclosure and a printer port. The printer cable includes a first connector for connecting to the printer port and a second connector for coupling to a host device (e.g., a personal computer (PC)). The printer cable includes a printer formatter for providing formatting services to the printer via the first connector. Since the printer formatter is integrated into the printer cable, the printer formatter is external to the printer enclosure and is easily removable and configurable by a user.

20 Claims, 8 Drawing Sheets

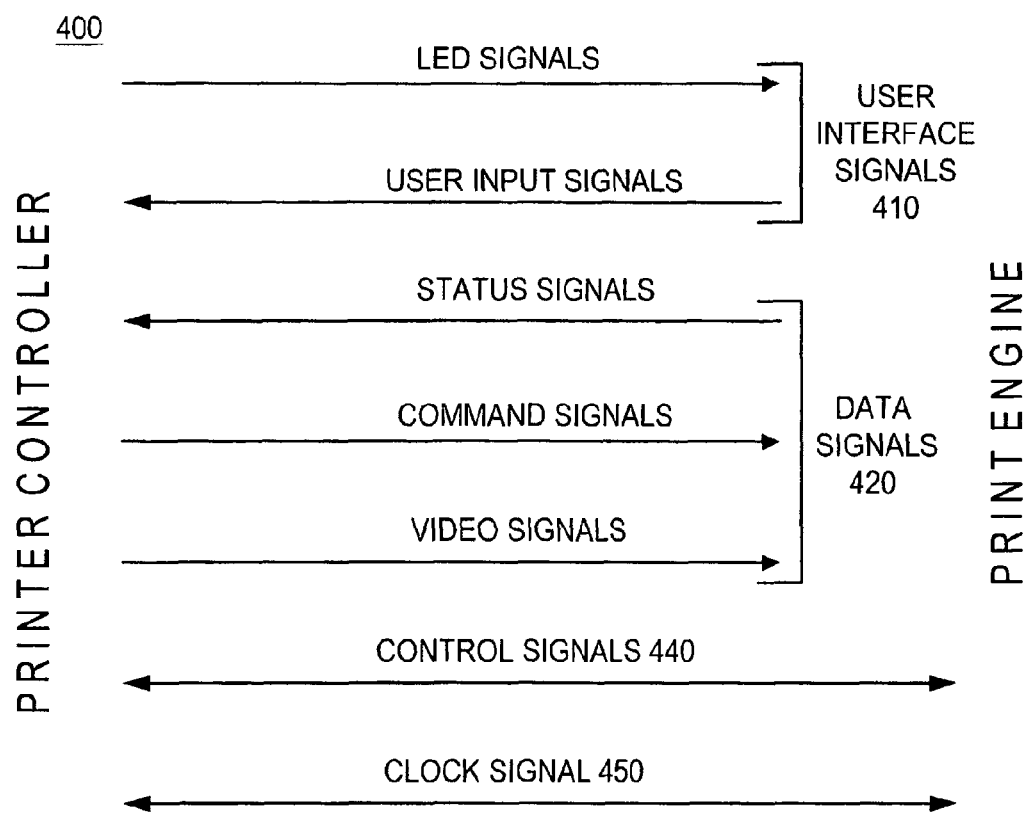

PRINTER FORMATTER IN A CABLE

This application is a continuation application of U.S. patent application Ser. No. 12/715,022, filed Mar. 1, 2010, which is a continuation application of U.S. patent application Ser. No. 11/851,120, filed Sep. 6, 2007 (now U.S. Pat. No. 7,715,039), which is a divisional application of U.S. application Ser. No. 09/675,194, filed Sep. 29, 2000 (now U.S. Pat. No. 7,268,900), the entirety of each is hereby incorporated by reference in its entirety.

FIELD OF THE INVENTION

The present invention relates generally to printers, and more specifically, to a printer formatter in a cable.

BACKGROUND OF THE INVENTION

The market for computer peripherals is highly competitive. In these markets, a large volume of sales is needed in order to be profitable since typically there is a low per product profit margin. In order to obtain a reasonable return on investment, the cost to manufacture the product must be kept low relative to the price of the product. Consequently, the successful manufacture and sale of computer peripherals often depend on reducing production costs and shortening the time-to-market of the products.

In the manufacture of computer peripherals, there are often many components and sub-assemblies that require testing and integration with other components and sub-assemblies. This process, which is generally known as system integration, is further complicated by the fact that these components and sub-assemblies are often manufactured by different parties.

For example, in the laser printer market, one party typically manufactures the print engine and another party is responsible for manufacturing the printer formatter that provides formatting functions to the print engine.

Furthermore, one sub-assembly cannot be completed until all components for that sub-assembly have been received and proper operation is verified with the other components. For example, since the printer formatter is integrated with the print engine, the manufacturer of the printer formatter has a shortened development time. The development time is shortened since the print engine manufacturer requires sufficient time to integrate the printer formatter with the print engine and to verify the proper operation of the printer formatter with the components of the print engine.

As can be appreciated, there are many costs and time consuming steps that are involved in system integration. Accordingly, manufacturers are constantly attempting to find ways to reduce costs and improve the efficiency of the above-described process.

FIG. 11 illustrates a block diagram of a conventional laser printer 1100. It is noted that the printer 1100 includes a printer controller 1104 that is coupled to a print engine 1108. The printer controller is also coupled to a printer controller interface 1118 for connecting a cable 1114 to the printer controller 1104. Since the printer controller 1104 is housed within the enclosure of the printer 1100, it is apparent that repairing or updating the printer controller 1104 is a complex and costly procedure that is not accessible to the average computer user. It would be desirable for a mechanism that allows the user to be able to easily access, configure, and upgrade the formatter. Unfortunately, this is not possible with the prior art printer system configuration.

Manufacturers of laser printers have typically focused their efforts at reducing costs by employing one of two different approaches. Unfortunately, these approaches, as will be described hereinafter, offer only minimal improvements, often inject inefficiencies in other areas, which often negate any improvements gained by the approach, and do not address the inefficiencies of the current upgrade solution.

The first prior art approach is to super-integrate the components of the printer formatter. This approach can reduce system costs. However, if the super-integrated chip is designed onto an embedded formatter (i.e., a formatter embedded into the print engine), then the development schedule for the formatter chip is shortened by the manufacturing lead-time of the print engine.

Additionally, it is difficult to integrate all the functional blocks of the formatter the processor, RAM, ROM, and interface) into a single integrated circuit. Typically, it is the size of the ROM that is the limiting factor. Accordingly, it is desirable to have a mechanism to reduce the amount of code that needs to be stored in the ROM, so that a higher level of integration can be achieved.

Second, upgrades in formatter functionality are difficult and costly to perform by the printer manufacturer. For example, if a user desires a new functionality, since the formatter is within the printer enclosure, and it is not easily accessible to the user, the users' options are very limited.

The first option is to buy a new printer with a new formatter integrated circuit having the new function. The second option is to send the printer to the print engine manufacturer, who in turn installs a new formatter integrated circuit in the printer and ensures compatibility with the print engine. Even then, the print engine manufacturer often times needs to perform extensive re-work on the printer to install the new formatter. As can be appreciated, this upgrade solution is not very efficient and relatively costly.

Another attempt to reduce costs and increase efficiency is to integrate the printer formatter with other electronics internal to the printer. These electronics can include the laser controller, which is commonly referred to as the "DC controller." Unfortunately, this approach suffers from several disadvantages.

First, although this approach reduces costs, the approach also can increase costs of developing and testing the DC controller because the printed circuit, board technology is not robust enough for the digital printer formatter.

Second, the components of a laser printer are highly dependent on each other. For example, the DC controller, the laser print engine, and the digital printer formatter are connected together in a particular format and are dependent upon each other. Consequently, the printer formatter cannot be replaced without requiring corresponding changes to the other components.

Based on the foregoing, it is desirable to provide a printer formatter that is external to the printer enclosure, easily removable, easily configurable, and that overcomes the disadvantages discussed above.

SUMMARY OF THE INVENTION

A printer cable that is configured for coupling to a printer having an enclosure and a printer port. The printer cable includes a first connector for connecting to the printer port and a second connector for coupling to a host device a personal computer (PC)). The printer cable includes a printer formatter for providing formatting services to the printer via the first connector. Since the printer formatter is integrated into the printer cable, the printer formatter is external to the printer enclosure and is easily removable and configurable by a user.

One aspect of the present invention is physically re-locating the printer formatter (also referred to as the printer controller) from the printer enclosure and implementing the printer formatter in printer cable that is external to the printer enclosure. One advantage of physically re-locating the printer formatter to be external to the printer enclosure is that the print formatter and its components may be designed, built, and shipped independently of the design, testing, building, and shipping of the print engine, thereby increasing efficiency, flexibility, and reducing costs.

In an alternative embodiment, the printer cable has a printer formatter and further includes a cable format conversion circuit for converting signals in a first format to signals in a second format. In this embodiment, the printer cable provides format conversion between a first format (e.g., USB) and a second format (e.g., IEEE 1284) in addition to printer formatter functions.

In yet another alternative embodiment, the printer cable has a printer formatter and further includes a multiple target support circuit for supporting at least two different, target devices. The multiple target support circuit includes a target independent block for providing formatting functions that are common to all the target devices. A first target interface circuit for providing an interface specific to the first target device and a second target interface circuit for providing an interface specific to the second target device are also provided. These different target devices can be ink jet printers and electrophotographic printers (e.g., laser printers). These different target devices can also be different electrophotographic printers, such as color printers, monochrome printers, multiple laser beam printers, and LED bar printers, etc.

BRIEF DESCRIPTION OF THE DRAWINGS

The present invention is illustrated by way of example, and not by way of limitation, in the figures of the accompanying drawings and in which like reference numerals refer to similar elements.

FIG. 4 illustrates in greater detail the PERD interface of FIG. 2.

FIG. 5 illustrates in greater detail the PCRD interface of FIG. 2.

DETAILED DESCRIPTION OF THE PREFERRED EMBODIMENT

A removable printer formatter implemented in a printer cable is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100

Figure 1:
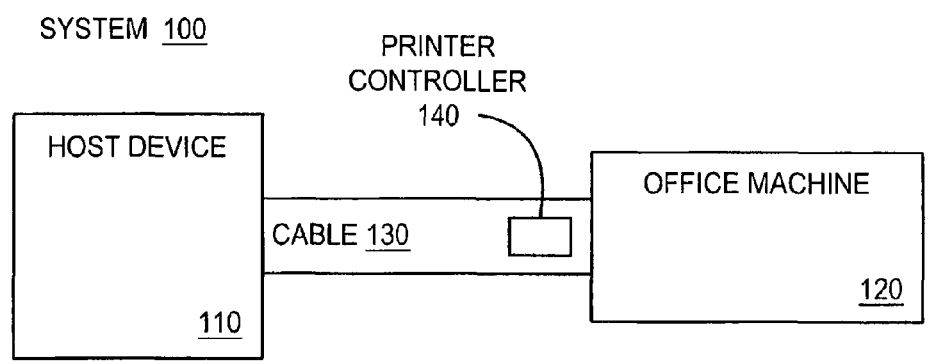
FIG. 1 is a diagram of a computer system configured in accordance, with one embodiment of the present invention.
Figure 11:
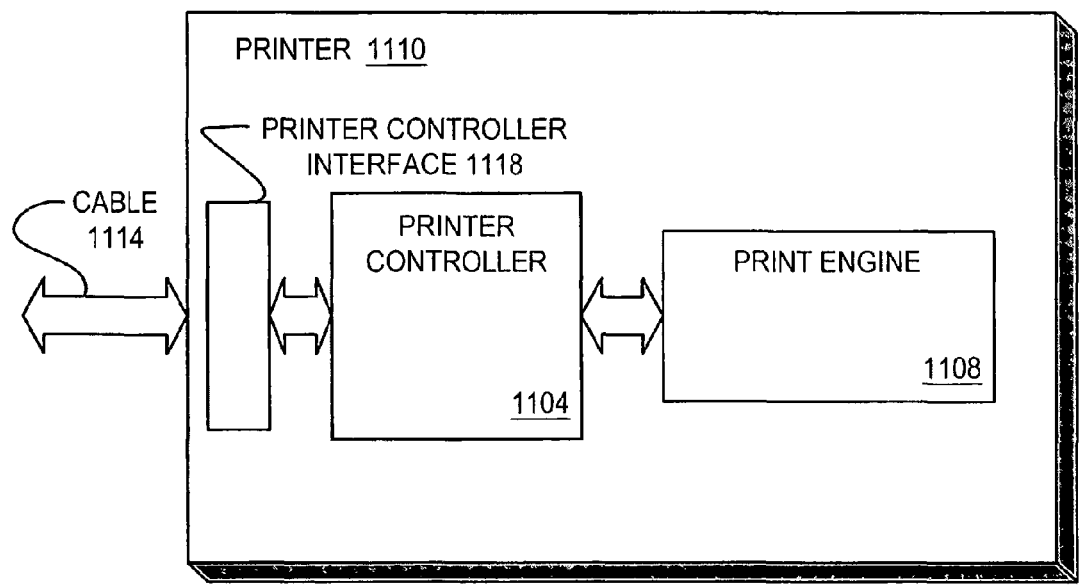
FIG. 11 is a block diagram of a prior art printer having a non-removable printer controller embodied therein.

FIG. 1 is a block diagram of a computer system 100 configured in accordance with one embodiment of the present invention. The computer system 100 includes a host device 110 (e.g., a personal computer (PC)) and an office machine 120 that is coupled to the host device 110 via a cable 130. The office machine 120 generates hard copies of electronic files (e.g., text files, graphic files, etc.). One aspect of the present invention is the provision of a printer controller 140 in the cable 130.

The office machine 120 can be, but is not limited to, include a printer (e.g., a laser printer or an ink-jet printer), facsimile machine, a multi-function machine (e.g., a fax/scanner/printer) or any machine that utilizes a print engine to generate a hard copy of a corresponding electronic document or file. The office machine 120 has an enclosure that houses the electrical and mechanical components of the office machine 120. These components can include a print engine, a DC controller, and mechanical assemblies for feeding the paper and controlling the laser beam.

By locating the printer controller 140 external to the housing of the office machine 120, the printer controller 140 can easily be removed or replaced as will be described hereinafter with reference to FIG. 6. Other aspects of the present invention include the provision of mechanisms for upgrading or adding features of the printer controller 140 in a user-friendly manner as will be described in greater detail hereinafter with reference to FIGS. 7 and 8.

Figure 2:
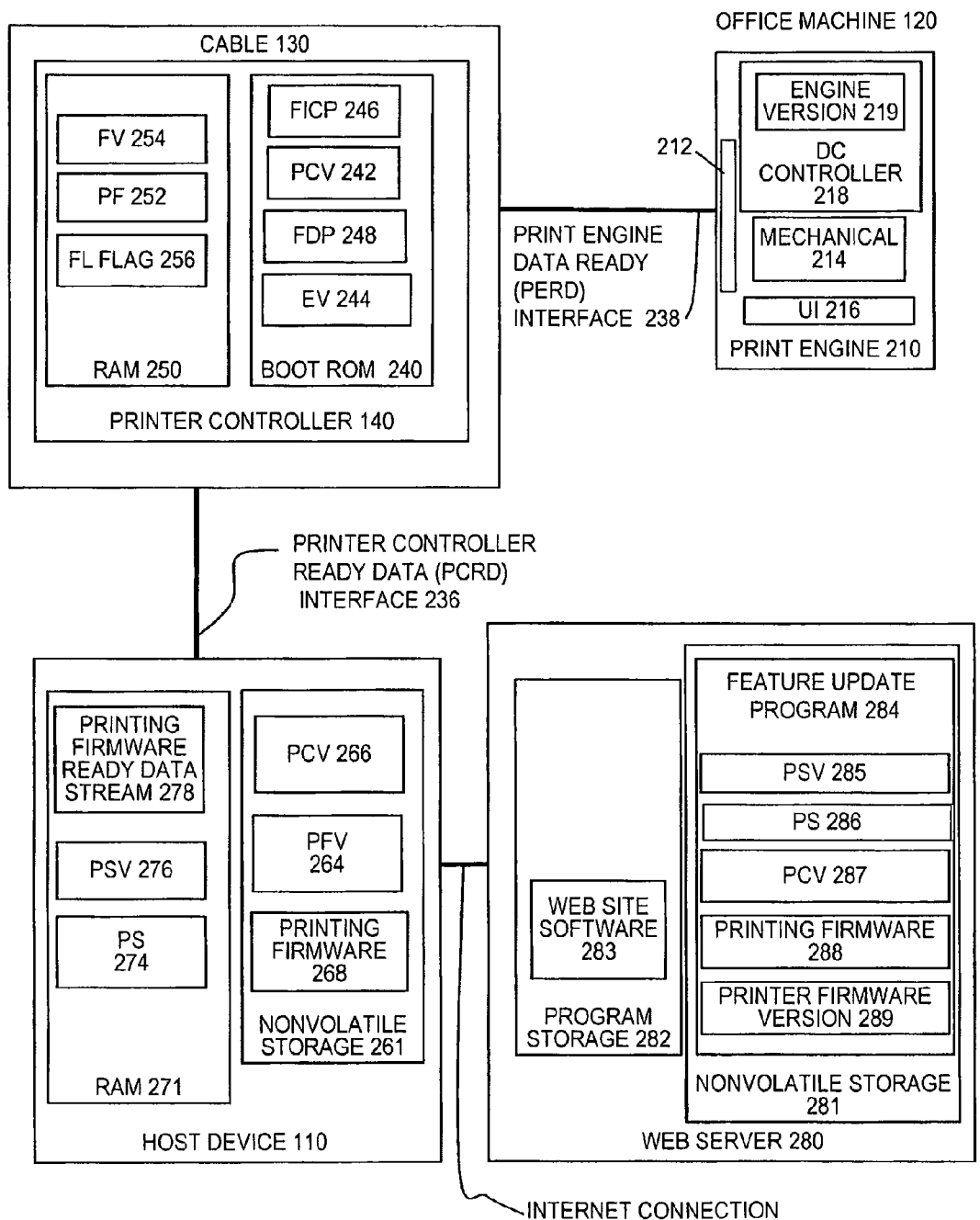
FIG. 2 is a block diagram illustrating in greater detail the components of the computer system of FIG. 1.

FIG. 2 is a block diagram illustrating in greater detail the components of the computer system 100 of FIG. 1. As described previously, the system 100 includes a host device 110 (e.g., a personal computer) coupled to the office machine 120 (e.g., a printer) via the cable 130.

Office Machine 120

The office machine 120 includes a print engine 210 for receiving the PERD from the printer controller 140 and for printing a page containing the PERD. The print engine 210 includes a mechanical control functional block 214 for moving the paper, a DC controller 218 for managing the laser printing process (e.g., controlling the print head, etc.), and a user interface block 216 for limited user input (e.g., print test page, reset, etc.). The construction and operation of these printer components are well-known by those of ordinary skill in the art. It is noted that the user interface 216 is provided for alerting a user as to the status of the printer or for receiving commands. The DC controller can include an engine version identifier 219 for identifying the currently installed print engine 210.

One aspect of the present invention is that the office machine 120 includes a port 212 that has a PERD interface instead of a PCRD interface. The port 212 provides an interface to the printer engine manufacturer's DC Controller (block labeled 218). This interface meets the specific needs of the aforesaid manufacturer and would typically be a custom interface or, potentially, an industry standard computer 10 interface, such as an IEEE 1284 interface or a USB interface.

Cable 130 with Printer Controller 140

The cable 130 includes the printer controller 140 for receiving the PCRD data and translating it into a print engine ready data (PERD). The PERD can be a stream of bits representing commands and data that the print engine 244 understands. The print engine 244 utilizes the PERD to print dots on a piece of paper. It is noted that another aspect of the present invention is that a second connector 238 of the cable 130 has a PERD interface instead of a PCRD interface.

The printer controller 140 utilizes a dynamically loaded printer controller program 252 (referred to herein also as "printer firmware") for controlling the functional blocks of the office machine 120 that is described below. The cable also includes a first connector with a PCRD interface 236 for coupling to a port of the office machine (e.g., a parallel printer port (LPT) when the office machine is a personal computer) and a second connector with a PERD interface 238 for coupling to the port 212 of the office machine (e.g., a corresponding parallel port when the office machine is a printer). The term "port" as used herein refers to any connection point on the office machine where data can be passed into or out of the office machine. The first connector that features a PCRD interface 236 will be described in greater detail hereinafter with reference to FIG. 5. The second connector that features a PERD interface 238 will be described in greater detail hereinafter with reference to FIG. 4.

The first connector can be any industry standard computer port interface that can be, but is not limited to an IEEE 1284 parallel port interface, a USE serial port interface, and an Ethernet interface. The second connector can be any industry standard computer port interface or a custom interface.

The printer controller 140 that has a boot read only memory (ROM) 240 and a volatile storage 250. The boot ROM 240 includes a printer controller version (PCV) identifier 242 for specifying the version of the installed printer controller 140, an engine version (EV) identifier 244 for specifying the version of the print engine 202. The boot ROM 240 can also include a printer controller integrity check program 246 (also referred to as firmware integrity check program (FICP)) and a printer controller download program 248 (also referred to as firmware download program (FDP)). The FDP 248 acts as a dynamic loading program whose operation are described in greater detail hereinafter.

The volatile storage 250 includes a non-resident printer controller program 252 (also referred to as printer firmware (PF)), a firmware version (FV) identifier 254 for specifying the version of the non-resident PF 252, and a firmware loaded flag (FLFLAG) 256. As described in greater detail hereinafter, the non-resident printer controller program (PP) 252 is loaded into the volatile storage 250 from a source (e.g., the host 110) whenever a print job is initiated.

One aspect of the present invention is the absence of a resident printer controller program, thereby saving space in the non-volatile memory 240. In this embodiment, the non-volatile memory (e.g., read only memory (ROM)) 240 of the printer controller 140 can have a very small footprint for storing only the boot code, thereby making the non-volatile memory more cost effective and simpler to integrate on a single integrated circuit. When the printer controller 140 is powered-down, there is no resident printer controller program therein.

Instead, the present invention provides a dynamic loading mechanism for selectively downloading a printer controller program from a source and storing it in a random access memory. For example, the printer controller 140 can include a dynamic loadings program (FDP) 248 for selectively downloading a printer control program from a source and storing the print engine control program in a random access memory (RAM) when a print job request is received or when the printer is initially powered-up. For example, the source can be a host device (e.g., a personal computer (PC)), a computer readable medium (e.g., a compact disc), or an Internet website.

Host 110

The host 110 can include a nonvolatile storage 261 (e.g., a read only memory (ROM)) and a program storage 271 (e.g., a random access memory (RAM)). As it relates to the present invention, the nonvolatile storage 261 can include a printer controller program 268 (also referred to herein as "printer firmware" of PF), a printer controller program version identifier (PFV) 264 for identifying the particular version of the printer controller program 268, and a printer controller version identifier 266 for specifying the version of the currently installed printer controller 140.

As it relates to the present invention, the volatile storage 271 can include printing software (PS) 274, a printer software version (PSV) identifier 276 for identifying the particular version of the printing software 274, and printer controller ready data (PCRD) 278 for transmission to the printer controller 140. The steps performed by the printing software 274 are described in greater detail with reference to FIG. 7.

The host device 110 can include an operating system (OS), such as Windows, and one or more software applications (e.g., a word processing software) that require print services. The word processing software communicates application data to be printed via the OS to a printing software 274 that associated with the office machine 120. The printing software 274 translates the application data into a printer controller ready data (PCRD), such as Postscript, PCI, or other custom PCRD data stream format. The PCRD can be a stream of bits representing commands and data that the printer controller 140 understands.

Web Server 280

The system can include a web server 280 that is connected via a network connection (e.g., an Internet connection) to the host 110. The web server 280 includes a nonvolatile storage 281 (e.g., a read only memory (ROM)) and a program storage 282 (e.g., a random access memory (RAM)). The program storage 282 includes web site software 283 that manages access to the content on the web site.

As it relates to the present invention, the nonvolatile storage 281 can include a feature update program 284 for providing updated versions of the printing software 286 and the printer controller program 288 (also referred to herein as "printer firmware") to the host 110. The nonvolatile storage 281 can also include printing software (PS) program 286. Each version of the printing software (PS) 286 is uniquely identified by an associated version (PSV) identifier 285. The printer controller program 288 is uniquely identified by an associated version identifier 289. The nonvolatile storage 281 can also include a printer controller version identifier 287 for identifying the versions of the printer controller that are compatible with a specific minting software 286 or specific printer controller program 288. It is noted that patches, updates, newer versions of the printing software 286 and the printer controller program 288 can be uploaded to the web server 280 by parties, such as the office machine 120 manufacturer, the printer controller 140 manufacturer, etc. and subsequently downloaded in a convenient fashion by a user.

PERD Interface

FIG. 4 illustrates in greater detail the PERD interface of FIG. 2 in accordance with one embodiment of the present invention. The exemplary PERD interface 400 includes user interface signals 410, data signals 420, control signals 440, and a clock signal 450.

User Interface Signals 410

One aspect of the present invention is the provision of a plurality of user interface signals 410 in the PERD interface. For example, the user interface signals 410 can include one or more signals for communicating displayable information to the print engine. The displayable signal can be utilized, for example, to turn of a light emitting diode (LED) in the printer to notify the user of a predetermined status or to print a message to a liquid crystal display (LCD) if the printer is so equipped. The user interface signals can include a second signal for receiving a user input signal front the printer. For example, these user input signals can be generated when a user presses one or more buttons on the printer. The user input signal can be in the form of a Button_Pressed or Button Released signal.

When the custom PERD interface is implemented as a serial interface, it is noted that the certain signals can be directed from the print engine to the printer controller, other signals can be directed from the printer controller to the print engine, yet other signals can be bi-directional therebetween.

It is noted that the PERD interface can also include other well known data, control, or status signals that are not described herein or be configured to include application specific signals.

PCRD Interface

FIG. 5 illustrates in greater detail the PCRD interface of FIG. 2 in accordance, with one embodiment of the present invention. The host 110 is connected to the printer controller 140 via the PCRD. The PCRD interface 236 is preferably implemented as an industry standard IO, such as USB, Ethernet or IEEE-1284, but may also be a custom interface.

The exemplary PCRD interface 500 includes one or more signal paths for transferring information (e.g., a data stream) from the host computer 110 to the printer controller 140 over the PCRD interface 236. The data stream is created by the printing software 274. The printer software 274 translates application data into printer controller ready data (PCRD), such as Postscript, PCL or other custom format, and then formats the data appropriately for the PCRD interface 236. This final formatting typically includes formatting to use the protocol required for the PCRD interface 236 (USE, Ethernet, IEEE-1284, etc.) such as error checking, packetization, addressing and the like. Consequently, the data stream can include a combination of printer controller ready data and final protocol formatting.

Printing Software 274

Figure 3:
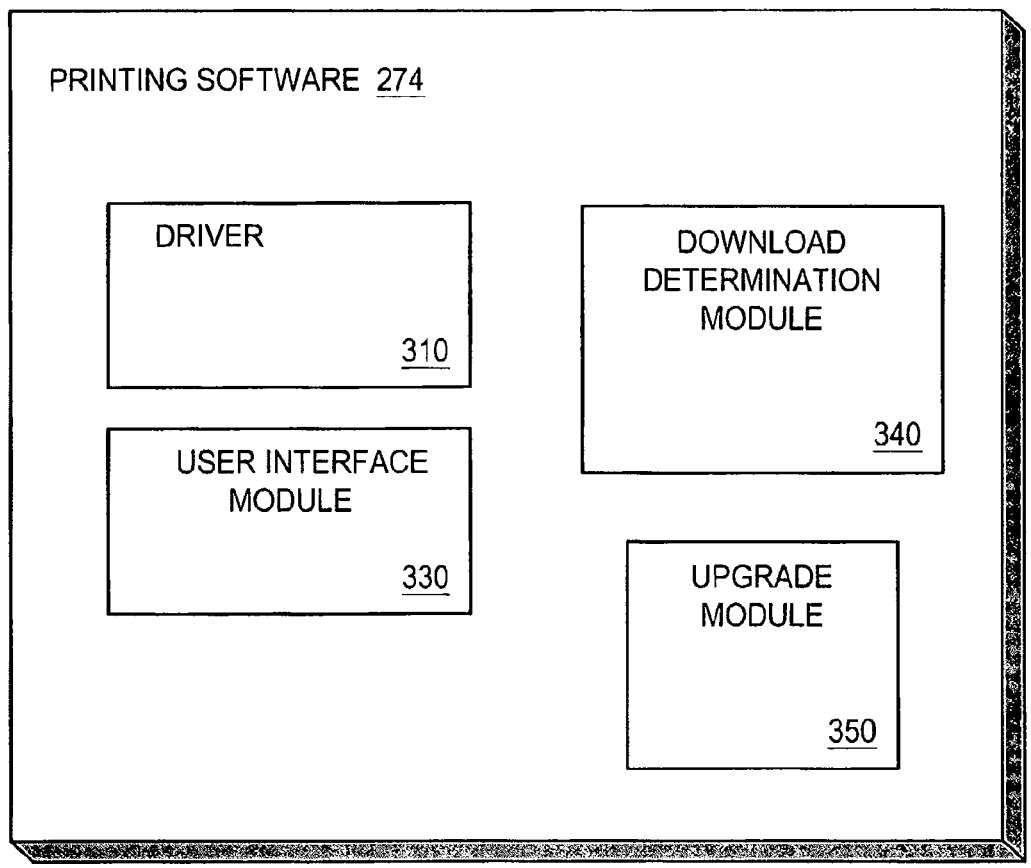
FIG. 3 is a block diagram illustrating in greater detail the printing software of FIG. 2.

FIG. 3 is a block diagram illustrating in greater detail the glinting software 274 of FIG. 2. The printing software 274 includes a driver 310, a user interface module 330, a download determination module 340 and an upgrade module 350. The driver 310 can be implemented with a standard driver that is well known by those of ordinary skill in the art. The printing software 274 provides the printer controller program 268 for downloading to the printer controller 140 upon certain predetermined conditions that are determined by the download determination module 340. The user interface module 330 is provided for receiving user input (e.g., paper size, print orientation, print resolution, etc.) provided from a graphic user interface (GUI) of the printing software 274 and is well known by those of ordinary skill in the art. The download determination module 340 queries the printer controller 140 for information (e.g., a signal to indicate the current version of the printer controller program loaded in the volatile memory 250 and a second signal to indicate whether the printer controller program is valid). Based on the received information, the download determination module 340 dynamically downloads the printer controller program 268 to the volatile memory 250 of the printer controller 140.

Cable Replacement

Figure 6:
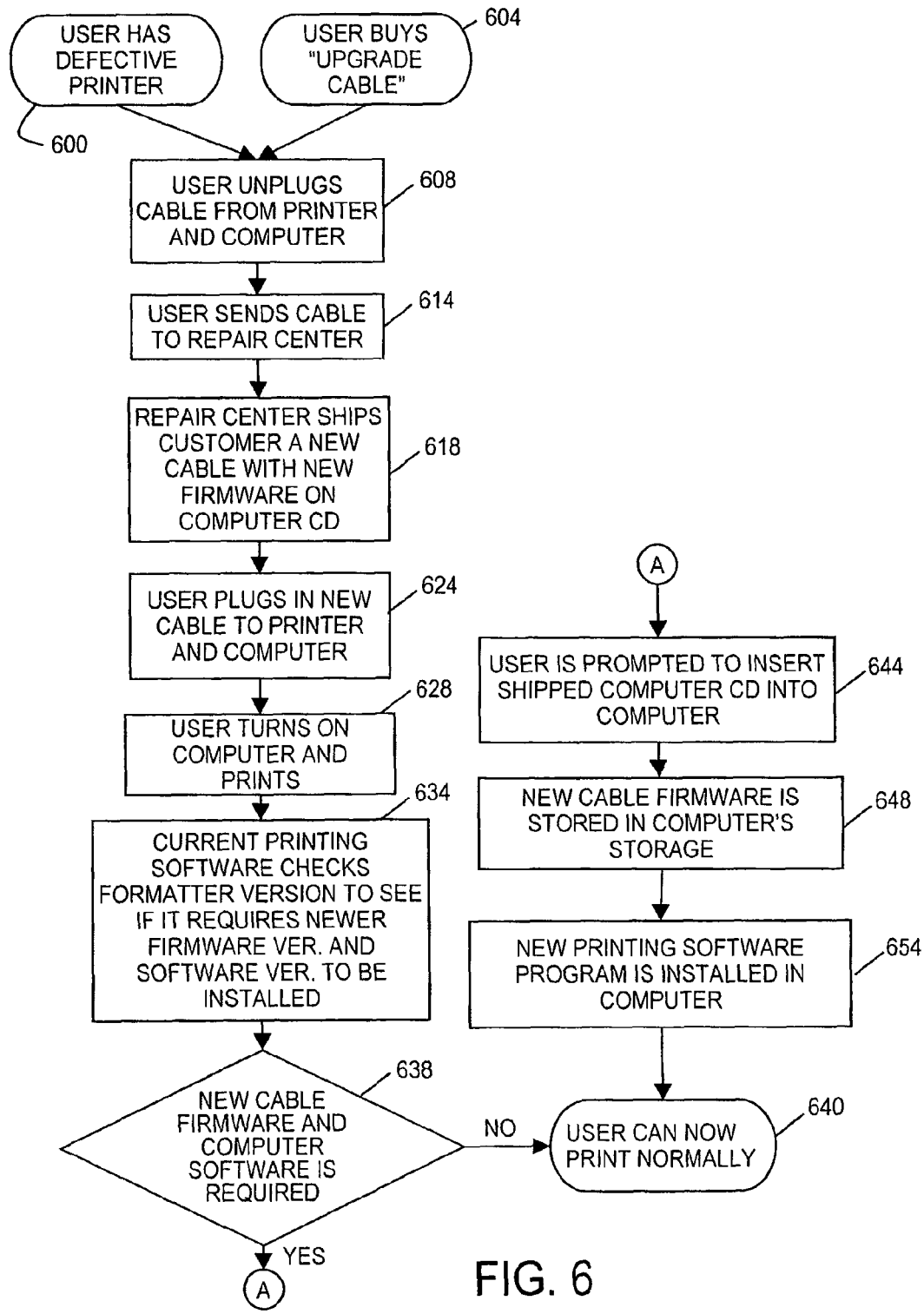
FIG. 6 is a flow chart illustrating the steps performed by a user to replace the cable and printer controller in accordance with one embodiment of the present invention.

FIG. 6 is a flow chart illustrating the steps performed by a user to replace the cable and printer controller in accordance with one embodiment of the present invention. The steps described herein are applicable whenever a new cable 130 and printer controller 140 is needed. For example, a user can purchases an "upgrade" cable, or a user can send a defective cable for repair.

In step 600, a user determines that a current printer is defective. Alternatively, a user in step 604 determines that an upgrade in printer controller capabilities is needed. In step 608, a user disconnects the cable 130 from the office machine 120 and the host 110. In step 614, the user sends the cable 130 with the printer controller 140 to a repair center. In step 618 the repair center sends to the customer a new cable and computer media (e.g., a compact disc) having loaded thereon new firmware (e.g., a new version of the printer controller program 268). Alternatively, if the user purchases an "upgrade" cable, steps 608 and 614 can be replaced with the steps of discarding the current cable and purchasing a new cable with computer media having new firmware loaded thereon.

In step 624, the user connects the new (or repaired) cable to the office machine 120 and the host 110. In step 628, the user turns on the host 110 and prints a document. In step 634, current printing software 274 checks the formatter version to determine if a newer version of the printer controller program 268 and a newer version of the printing software 274 need to be installed.

In decision block 638, a determination is made whether a newer version of the printer controller program 268 or a newer version of the printing software 274 is needed. If no, then the user can print (step 640).

If a newer version of the printer controller program 268 or a newer version of the printing software 274 is needed, then the user is prompted to insert the computer media (e.g., compact disc) into the host 110 (step 644). In step 648, a new printer controller program 268 is stored in the storage (e.g., non-volatile memory 516) of the host 110. In step 654, a new printing software 274 is installed in the host 110. Processing then proceeds to step 640, where a user can print. The print process in accordance with one embodiment of the present invention is described in hereinafter with reference to FIG. 7.

Printing Flow

Figure 7:
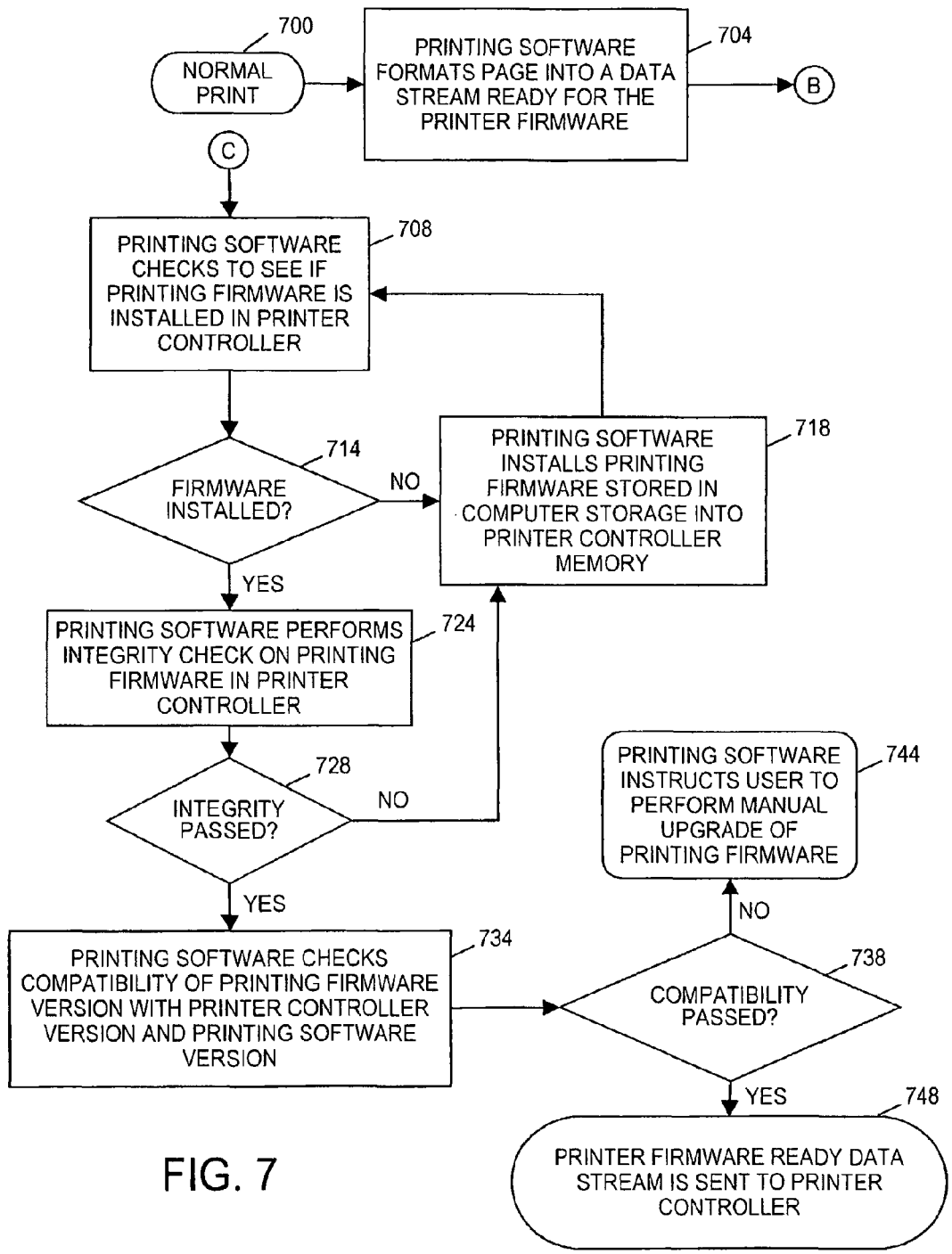
FIG. 7 is a flow chart illustrating the steps performed by the printing software of the system of FIG. 1 in accordance with one embodiment of the present invention.

FIG. 7 is a flow chart illustrating the steps performed by the printing software of the system of FIG. 1 in accordance with one embodiment of the present invention. In step 700, normal printing is initiated by the user. Printing can be initiated by a user selecting a print button in an application (e.g., a word processing document). In step 704, the printing software 274 formats a page into a data stream that is ready for the printer controller 268. Processing then proceeds to step 854 of FIG. 8.

Figure 8:
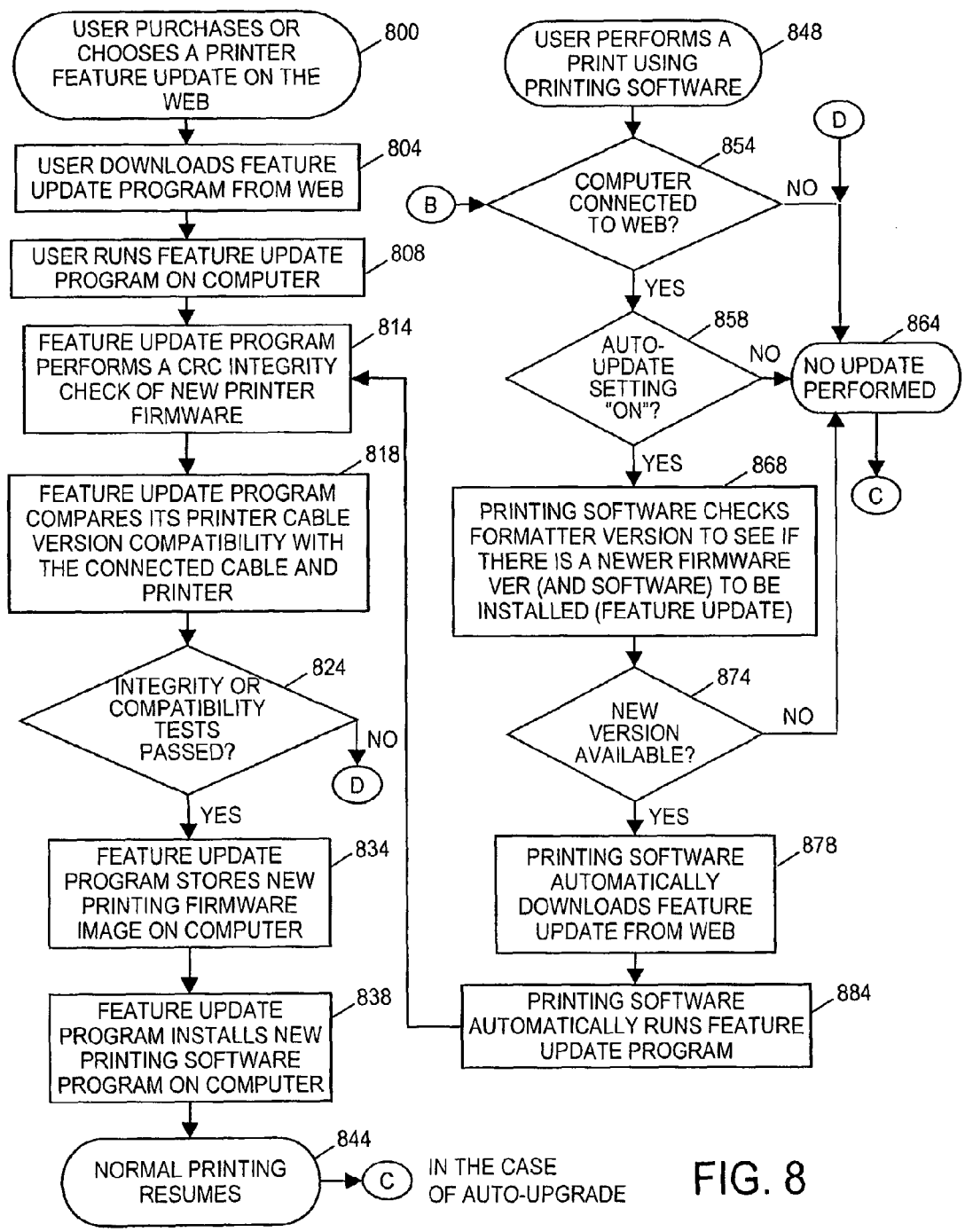
FIG. 8 is a flow chart illustrating the steps performed by the upgrade module of the system of FIG. 1 in accordance with one embodiment of the present invention.

After the processing that occurs in FIG. 8, processing returns to step 708 of FIG. 7 from step 844 or step 864 of FIG. 8. In step 708, the printing software 274 checks to determine if the printer controller program 268 is installed in the printer controller 140. In decision block 714, if the printer controller program 268 is installed, then processing proceeds to step 724. Otherwise, processing continues at step 718. In step 718, the printing software 274 installs the printer controller program 268 that is stored in the storage of the host 110 into the storage (e.g., RAM 250 of the printer controller 140).

In step 724, the printing software 274 performs an integrity check on the printer controller program 268 in the printer controller 268. The integrity check is for determining whether the bits in the printer controller program 268 has been corrupted and can be a cyclic redundancy check (CRC) that is well known by those of ordinary skill in the art. In decision block 728, a determination is made whether the printer controller program 268 has passed the integrity test. If the printer controller program 268 fails the integrity test, then processing proceeds to step 718.

If the printer controller program 268 passes the integrity test, then processing proceeds to step 734. In step 734, the printing software 274 checks the compatibility of the version of the printer controller program to the version of the printing software 274. In decision block 738, a determination is made whether the compatibility test has been passed. If the compatibility test fails, then processing proceeds to step 744. In step 744, the printing software 274 instructs the user to perform a manual upgrade of the printer controller program 268. If the compatibility test is successful, then in step 748 the printer controller ready data (PCRD) data stream is sent to the printer controller 140.

Upgrade Module 350

One aspect of the present invention is the provision of an automatic upgrade module 350 that automatically or at user request connects to a source of more recent versions of the printer controller program 268 and downloads the printer controller program 268 to the printing software 274. The source can be, for example, an Internet web site of a developer of printer controller programs.

In the preferred embodiment, the present invention provides a mechanism (e.g. upgrade module 350) to dynamically update the printer controller 140 with a modified printer controller program (e.g., a more current or up-to-date version) without user intervention and a mechanism to dynamically update a current printing software 274 resident on the host 110 with a modified printing software 286 (more current version) without user intervention.

It is noted that the update module 350 can also automatically update the printer fin 268 with a more recent version, such as printer firmware 288. Subsequently, the updated firmware can be automatically downloaded to the printer controller 140.

FIG. 8 is a flowchart illustrating the steps performed by the upgrade module 350 in upgrading the printer controller program 268 in accordance to one embodiment of the present invention.]

In step 800, a user purchases or chooses a printer feature update that is provided by a web site of the update provider. In step 804, the user downloads a feature update program from the web server 280. In step 808, the user runs the feature update program on the host 110. In step 814, the feature update program performs an integrity check (e.g., a CRC integrity check) of the new printer controller program.

In step 818, the compares its printer cable version with the connected cable and printer. In decision block 824, it is determined whether both the integrity and compatibility tests have been passed. If both tests have been passed, then in step 834 the feature update program stores the new printer controller program 268 into the storage (e.g., non-volatile storage) in the host 110. In step 838 the feature update program installs the new printing software 274 on the host 110. Processing then continues to step 844 where normal printing resumes. Processing then proceeds to step 708 of FIG. 7.

In step 848 a user performs a print using printing software 274. In decision block 854, it is determined whether the host 110 is connected to the Internet. If the host 110 is not connected to the Internet, then no update is performed (step 864). Processing then proceeds to step 708 of FIG. 7.

If the host 110 is connected to the Internet, then in decision block 858, a determination is made whether an auto-update setting is on? If the auto-update setting is on, then in step 868 the printing software 274 (e.g., the download determination module 340) compares the version of the printer controller program 268 with the version of the most current printer controller program residing on the web server 280 to determine if there is newer printing software 286 or newer printing firmware 288 to be installed (e.g., a feature update or patch).

In decision block 874, a determination is made whether a newer version of either the printer controller program 268 or the printing software 274 is available. If a newer version of either is available, processing proceeds to step 878 where the newer version is downloaded. If a newer version of either is unavailable, no update is performed (step 864).

In step 878 the printing software 274 automatically downloads the feature update program from the web server 280. In step 884 the printing software 274 automatically runs the feature update program. Processing then continues to step 814.

Host-Based Printing

It is noted that the intelligence (e.g., the image processing algorithms) can reside primarily in the printer controller program 268 that is dynamically loaded in the printer controller 140 or the printing software 274 that resides on the host. In the preferred embodiment, the intelligence is primarily included in the printing software 274 to provide a host-based printing system. By off-loading such tasks as print formatting, graphical operations related to rendering and drawing graphical objects to host, the design of the printer controller 140 can be streamlined to provide a size-sensitive single integrated circuit solution for the printer controller 140 that includes all the components needed (e.g., the volatile memory 250 and the read only memory 237) to implement the printer controller 140). This host-based approach also advantageously leverages the processing power that is resident in the host PC, thereby allowing the processor resident in the printer controller 140 to be simplified.

In the host-based approach, the printer controller program 268 performs the following tasks. First, the printer controller program 268 receives a compressed PCRD data stream. Second, the printer controller program 268 decompresses the compressed PCRD data stream. Next, the printer controller program 268 formats the PCRD data into a PERD format that can be utilized by the print engine 210. It is noted that the graphics rendering and image processing is performed by the printing software 274 that executes on the host 110.

In a non-host based approach, the printer controller program 268 performs the following tasks. First, the input/output PCRD data stream is parsed to recover the print commands (e.g., high-level print commands, such as PCL or Postscript) embedded therein. Second, the print commands are decoded and processed. For example, the high-level print language commands are converted into graphic primitives. Third, the print data is converted from a first format (PCRD data) into a PERD data that that can be utilized by the print engine 210.

Cable Format Conversion Mechanism

Figure 9:
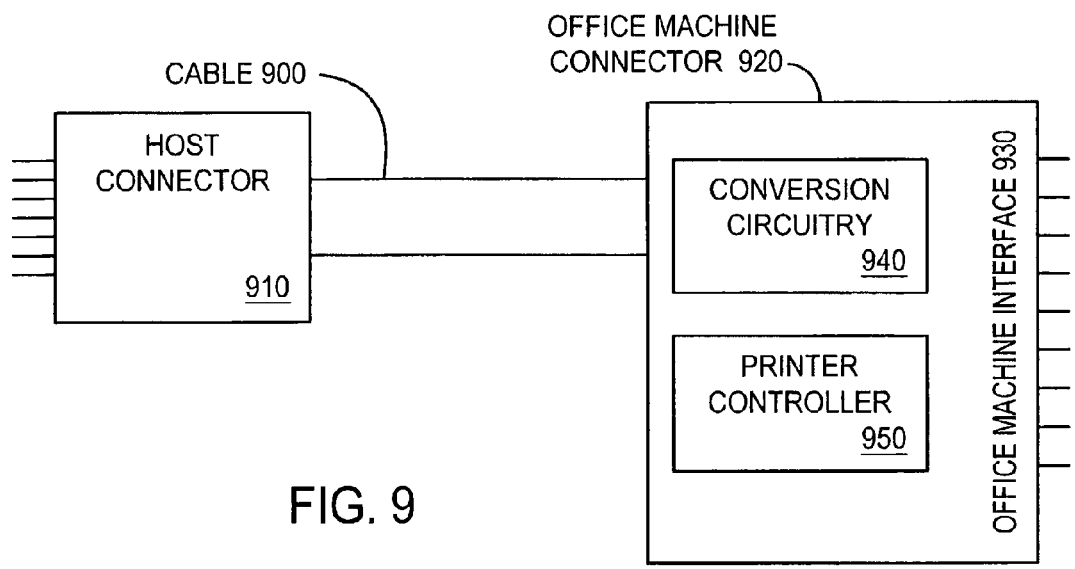
FIG. 9 is a block diagram illustrating in greater detail the cable of FIG. 1 configured in accordance with a second embodiment of the present invention that has a cable format conversion feature.

FIG. 9 is a block diagram illustrating a cable 900 that is configured in accordance with a second embodiment of the present invention in which the cable includes both a printer controller and a cable conversion mechanism. The cable 900 includes a first connector 910 with a PCRD interface for coupling to the host 110 and a second connector 930 with a PERD interface for coupling to the office machine 120. The cable 900 includes a connector shell 920 that has a printer controller 950, whose operation and components have been described previously, and conversion circuitry 940. The conversion circuitry 940 for converting signals in a first format into corresponding signals in a second format is well-known by those of ordinary skill in the art and is not described in greater detail hereinafter. It is noted that the features described in connection with the printer controller 950 of the present invention can be combined with cable conversion circuitry or mechanism 940.

It is noted that the printer controller 950 can be enhanced with a conversion program to convert between two industry standard IOs provided the connector to the Print Engine is an industry standard interface as well. For example, the printer controller 950 can perform the dual functions of 1) providing a custom interface over a standard connector, such as an IEEE 1284 B connector, to a printer without an internal formatter, and 2) converting the custom interface or protocol to an industry standard protocol (e.g., IEEE-1284 protocol) for other printers that have a built in formatter and that uses the IEEE-1284 B connector and the IEEE-1284 protocol.

Figure 10:
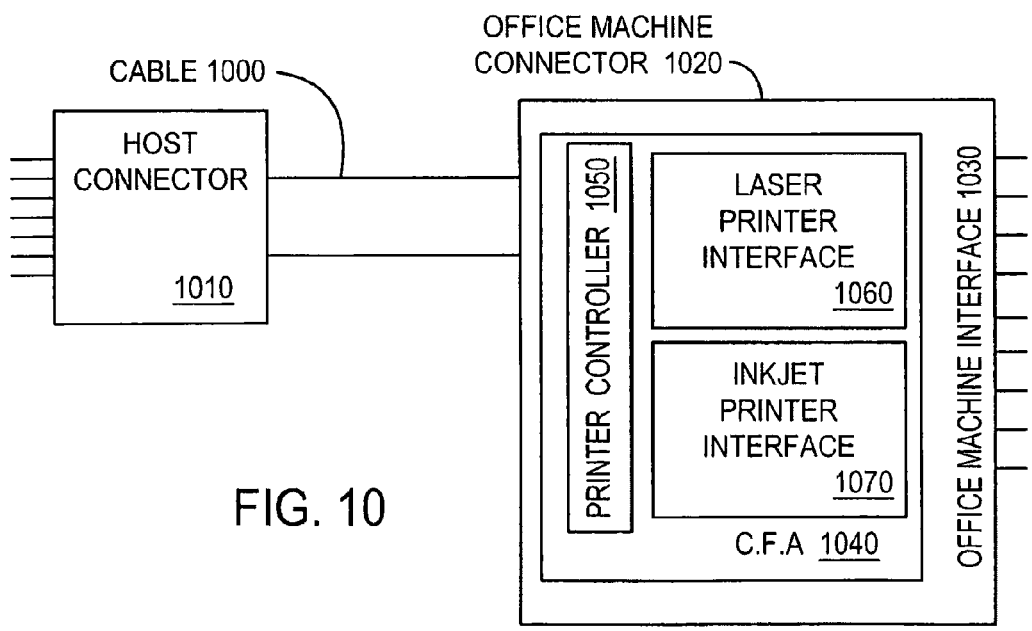
FIG. 10 is a block diagram illustrating in greater detail the cable of FIG. 1 configured in accordance with third embodiment of the present invention that has a multiple target device support feature.

An exemplary conversion circuitry 940 can include the following components whose construction, operation and use are well-known by those of ordinary skill in the art:
Microprocessor or dedicated logic
Processor support logic (e.g., interrupt/timer/watchdog/etc.)
Embedded RAM and ROM
I/O interface(s)
Conversion program executing on the above
Multiple Target Device Support Mechanism FIG. 10 is a block diagram illustrating a cable 1000 that is configured in accordance with a third embodiment of the present invention in which the cable includes both a printer controller and a multiple target device support mechanism.

The cable 1000 includes a first connector 1010 with a PCRD interface for coupling to the host 110 and a second connector 1030 with a PERD interface for coupling to the office machine 120. The cable 1000 includes a connector shell 1020 that has a printer controller 1050, whose operation and components have been described previously, and a common formatting architecture 1040. The common formatting architecture 1040 provides those functions that are common to one or more interface specific blocks, such as a laser printer interface 1060 for interfacing with laser printers, and a non-impact printer interface 1070 for interfacing with non-impact ink printers (e.g., ink jet printers). It is noted that the features described in connection with the punter controller 1050 of the present invention can be combined with a multiple target device support feature or mechanism.

An exemplary common formatting block 1040 can include the following components whose construction, operation and use are well-known by those of ordinary skill in the art:
Microprocessor
Processor support logic (interrupt/timer/watchdog/etc.)
Embedded DRAM or memory interface(s)
I/O interface(s) (USE 2.0 for example)
Compression; Decompression Hardware (CODEC)
Graphics processing hardware
Color mapping
Gray Scale Dithering
Raster manipulation and rendering
Scaling/Enhancement/Filtering/etc.
General-purpose I/O An exemplary laser printer interface 1060 can include the following components whose construction, operation and use are well-known by those of ordinary skill in the art:
Laser printer front panel controller
Print mechanism communications interface
Laser beam synchronization detect logic
Electrophotographic-specific resolution enhancement functions
Electrophotographic-specific draft mode hardware
Laser-beam video stream serializer
Paper handling controller and/or interface An exemplary non-impact ink printer interface 1070 can include the following components whose construction, operation and use are well-known by those of ordinary skill in the art:
Ink printer front panel controller
Print head controller chip interface(s) with appropriate video streams
Print motor controller interface(s)
Head position sensor interface(s)
Ink-head-specific resolution enhancement hardware
Ink-head-specific draft mode hardware
Paper handling controller An alternative example would be a multi-function device (e.g., an all-in-one office machine that provides copy/fax/print functions). In this case, hardware for copy/FAX functions may be added to the components listed above.

In the foregoing specification, the invention has been described with reference to specific embodiments thereof. It will, however, be evident that various modifications and changes may be made thereto without departing, from the broader scope of the invention. The specification and drawings are, accordingly, to be regarded in an illustrative rather than a restrictive sense.

What is claimed is:

1. A printer controller embedded in a removable cable, the printer controller comprising:
a first interface configured to be coupled to a host and receive print controller ready data from the host;
a formatter configured to format the print controller ready data to print engine read data for at least two types of printers, wherein the formatter comprises target independent circuitry configured to perform common formatting for the at least two types of printers;
a second interface configured to be coupled to and removable from a printer and configured to transmit the print engine ready data to the printer;
wherein the printer controller is in communication with a storage unit storing a printer controller program, and the printer controller is configured to:
determine whether the printer controller program is valid based on at least one aspect of the printer or the host; and
control storage of an updated printer controller program in the storage unit in response to determining that the printer controller program is not valid.

2. The printer controller of claim 1, wherein the printer controller is further configured to:
perform an integrity check on the printer controller program to determine whether the printer controller program is corrupted.

3. The printer controller of claim 1, wherein the at least one aspect includes a version of a print engine in the printer.

4. The printer controller of claim 1, wherein the at least one aspect includes a version of a printer software on the host.

5. The printer controller of claim 4, wherein the printer controller is further configured to:
clear the updated printer controller program from the storage unit when the printer controller is powered down.

6. The printer controller of claim 1, wherein the printer controller program is configured to convert between two industry standard IOs.

7. The printer controller of claim 1, wherein the at least two types of printers comprise a laser printer and an inkjet printer.

8. The printer controller of claim 1, wherein the printer controller is further configured to:
upgrade the printer controller without user intervention.

9. A printer controller embedded in a removable cable, the printer controller comprising:
- a communication interface configured to communicate with a first interface coupled to a host computer and a second interface coupled to and removable from a printer;
- a formatter configured to format print controller ready data to print engine ready data, the formatter comprising target independent circuitry configured to perform common formatting for at least two types of printers; and
- a storage interface configured to communicate with a storage unit storing a first printer firmware,
- wherein the printer controller is configured to:
  - determine whether the first interface has been connected to the host computer;
  - in response to determining the first interface is connected to the host computer, determine whether the first printer firmware is valid;
  - receive a second printer firmware from the host computer in response to determining that the first printer firmware is not valid;
  - format, using the target independent circuitry, the print controller ready data received from the host computer to the print engine ready data; and
  - transmit the print engine ready data via the second interface to the printer.

10. The printer controller of claim 9, wherein the second printer firmware is downloaded onto the host computer from a server, a computer readable medium, or a website.

11. The printer controller of claim 9, wherein the printer controller is further configured to:
perform an integrity check on the second printer firmware to determine whether the second printer firmware is corrupted.

12. The printer controller of claim 11, wherein the integrity check is a cyclic redundancy check of bits of the second printer firmware.

13. The printer controller of claim 9, further comprising:
clearing the second printer firmware from the storage unit.

14. The printer controller of claim 9, wherein the printer controller is configured to convert between two industry standard IOs.

15. The printer controller of claim 9, wherein one of the at least two types of printers comprise an inkjet printer.

16. The printer controller of claim 9, wherein the printer controller is further configured to:
upgrade the printer controller without user intervention.

17. The printer controller of claim 1, wherein the host is configured to automatically determine whether the printer controller is compatible with a printing firmware stored in the host.

18. The printer controller of claim 17, wherein the printer controller is further configured to:
determine whether the host requires a different version of the printing firmware based on a pre-determined version of the printer controller program.

19. The printer controller of claim 18, wherein the printer controller is further configured to:
request a user of the host to install the different version of the printing firmware into the host in response to determining that the host requires the different version of the printing firmware.

20. The printer controller of claim 1, wherein:
the at least two types of printers comprise a first type of printer and a second type of printer; and
the formatter further comprises first target circuitry configured to perform formatting specific to the first type of printer, and second target circuitry configured to perform formatting specific to the second type of printer.

* * * * *